(No Model.)

A. W. AUSTIN.
SYSTEM OF WATER SUPPLY.

No. 586,653. Patented July 20, 1897.

Witnesses.

Inventor:
A. W. Austin
by Fetherstonhaugh & Co
Attys

UNITED STATES PATENT OFFICE.

ALBERT WILLIAM AUSTIN, OF TORONTO, CANADA.

SYSTEM OF WATER-SUPPLY.

SPECIFICATION forming part of Letters Patent No. 586,653, dated July 20, 1897.

Application filed February 24, 1896. Serial No. 580,445. (No model.)

*To all whom it may concern:*

Be it known that I, ALBERT WILLIAM AUSTIN, of the city of Toronto, in the county of York, in the Province of Ontario, Canada, have invented a certain new and useful Improved System of Water-Supply, of which the following is a specification.

My invention relates to an improved system of water-supply for cities and towns; and the object of the invention is to design a supplemental system of water-supply particularly adaptable in case of fires where an increased pressure is required in excess of the ordinary pressure of the mains; and it consists, essentially, in providing for the different streets or sets of blocks of buildings a supplemental set of strong steel pipes in addition to the ordinary water-pipes, which have the same pressure throughout, such supplemental set of pipes being connected to the main distributing-pipe by branch pipes having an interposed pumping-engine, preferably electrical, which derives its power through a line-wire connection to a generator coupled to the main pumping-engine in the waterworks power-house, as hereinafter more particularly explained.

Figure 1:
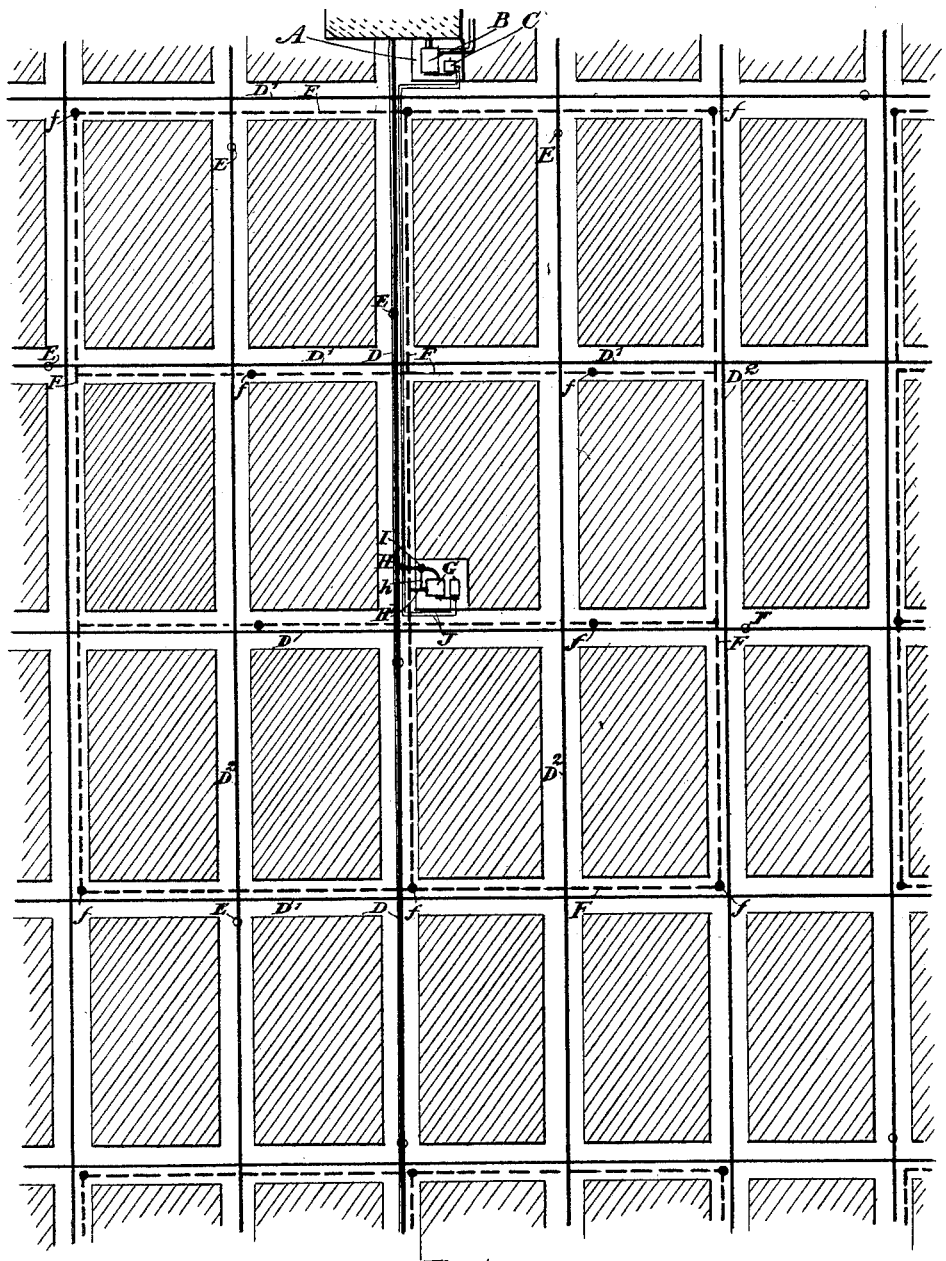
Figure 2:
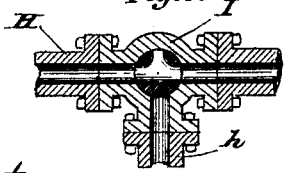

Figure 1 is a diagrammatic view showing the arrangement of my water-supply in a city or town in which the streets are arranged in blocks. Fig. 2 is a sectional detail of a three-way valve employed in connection with my electrical pumping-engine connecting the main distributing-pipe with the supplemental set of pipes.

In the drawings like letters of reference indicate corresponding parts in each figure.

A is the main pumping-station, B the pumping-engine, and C the generator coupled thereto.

D is the main distributing-pipe, which is connected to a series of branch pipes D' D², which are supplied with the water from the main pipe at the ordinary pressure either from a reservoir or, as shown, by a pump. The ordinary pipes D' and D² serve to supply the city or town with water at the ordinary pressure, hydrants E (indicated by open circles) being supplied at desired points, as shown. The branch pipes D' and D² are indicated by full lines, as shown. F are supplemental pipes which are arranged in a complete block system. Such pipes are preferably made of steel.

G is a pumping-engine preferably deriving power from an electrical source. The pump G is connected by the pipe H to the main distributing-pipe D and by the pipe H' to the supplemental set of pipes F. A branch pipe $h$ is preferably provided between the pipe H and the pipe H' outside of the pump, so that under ordinary circumstances the water from the mains will pass directly through this pipe instead of through the pump into the supplemental set of pipes. The three-way valve I, such as shown in Fig. 2, is provided at the point of juncture of the pipe H with the pipe $h$.

J are wires connecting the motor of the pump to the generator C, which is, as before stated, coupled to the pumping-engine B.

The supplemental pipes F are provided with hydrants $f$ at various points throughout the block. Under ordinary circumstances the branch pipes and the supplemental pipes are supplied with water at the usual pressure. Should a fire occur in any part of this district or set of blocks, the generator may be thrown in and the pump G set going, the valve I being turned so as to allow the water to go through the pump, and such pump may be employed to increase to the greatest extent possible the pressure through the supplemental set of pipes, which being very strong will of course be able to stand such pressure. In so increasing the pressure through the supplemental set of pipes it will of course be understood that the ordinary branch pipes will not be interfered with, but will be under ordinary pressure. It will thus be seen that the supplemental set of pipes with their hydrants $f$ throughout may be utilized where the highest stream is required to be thrown—that is to say, for the upper stories of high buildings. If necessary, for the lower stories of the building the hydrants of the ordinary system of distributing-pipes may be utilized, these of course containing water under ordinary pressure.

I am aware that a system of water-supply for cities having a main pipe and distributing-pipes has been used before in which a portion of the pipes are connected to the other portion by valves throughout the system, but I do not lay claim to any such construction, as my supplemental system of pipes is entirely independent of the ordinary pipes.

In this specification it will be noticed that I provide a generator coupled to the pumping-engine at the main station and having the wires leading therefrom to the pump situated in each block. The advantage of this arrangement will be apparent, as there is always sufficient extra power at the main station to run a generator, and thereby in cities and towns an economy is effected which would not be the case if the power had to be derived from an electrical company.

What I claim as my invention is—

In a water-supply system, in combination, a main distributing-pipe, the ordinary distributing-pipes leading from the main pipe, and the independent distributing-pipes arranged in block system and paralleling said main and ordinary distributing-pipes, said independent system having a single connection with the main pipe, and being permanently out of connection with the ordinary pipes, substantially as described.

ALBERT WILLIAM AUSTIN.

Witnesses:
B. BOYD,
H. DENNISON.